United States Patent
Wengelnik et al.

(10) Patent No.: US 10,168,858 B2
(45) Date of Patent: Jan. 1, 2019

(54) METHOD FOR DISPLAYING INFORMATION IN A VEHICLE, AND A DEVICE FOR CONTROLLING THE DISPLAY

(71) Applicant: VOLKSWAGEN AG, Wolfsburg (DE)

(72) Inventors: Heino Wengelnik, Wolfsburg (DE); Andreas Medler, Lengede (DE); Ralf Siegel, Dresden (DE)

(73) Assignee: VOLKSWAGEN AG (DE)

( * ) Notice: Subject to any disclaimer, the term of this patent is extended or adjusted under 35 U.S.C. 154(b) by 69 days.

(21) Appl. No.: 14/440,605

(22) PCT Filed: Oct. 23, 2013

(86) PCT No.: PCT/EP2013/072176
§ 371 (c)(1),
(2) Date: Jun. 24, 2015

(87) PCT Pub. No.: WO2014/072177
PCT Pub. Date: May 15, 2014

(65) Prior Publication Data
US 2015/0286367 A1    Oct. 8, 2015

(30) Foreign Application Priority Data
Nov. 6, 2012 (DE) .................. 10 2012 021 627

(51) Int. Cl.
*G06F 3/0481* (2013.01)
*B60K 37/06* (2006.01)
(Continued)

(52) U.S. Cl.
CPC .......... *G06F 3/04817* (2013.01); *B60K 35/00* (2013.01); *B60K 37/06* (2013.01);
(Continued)

(58) Field of Classification Search
CPC .................. B60K 37/06; B60K 35/00; B60K 2350/1007; B60K 2350/1016;
(Continued)

(56) References Cited

U.S. PATENT DOCUMENTS 9,418,706 B2 * 8/2016 Oosterholt ............ G06F 3/0482
2007/0252822 A1   11/2007 Kim et al.
(Continued)

FOREIGN PATENT DOCUMENTS

DE    102007039442 A1    2/2009
WO    2009062677 A2      5/2009

OTHER PUBLICATIONS

Search Report for German Patent Application No. 10 2014 200 993.6; dated Oct. 9, 2014.
(Continued)

*Primary Examiner* — Christopher E Leiby
(74) *Attorney, Agent, or Firm* — Barnes & Thornburg LLP

(57) ABSTRACT

A method for displaying information in a vehicle, in which list entries from a list are allocated to graphical objects and, in a main view, a partial amount of the graphical objects are displayed by a display device arranged in the vehicle; a control device modifying the graphical data, as a result of an input from an input device, so that the graphical objects in the displayed partial amount are modified. As the result of an input using an input device, the control device changes to a configuration mode which determines which graphical objects are allocated to the partial amount whose graphical objects are displayed in the main view. Also disclosed is a device for carrying out the method.

16 Claims, 2 Drawing Sheets

(51) Int. Cl.
   *B60K 35/00*      (2006.01)
   *G06F 3/0485*     (2013.01)
   *G06F 3/0488*     (2013.01)
(52) U.S. Cl.
   CPC .......... *G06F 3/0485* (2013.01); *G06F 3/0488*
          (2013.01); *B60K 2350/1004* (2013.01); *B60K
               2350/1016* (2013.01); *B60K 2350/1028*
               (2013.01); *G06F 2203/04104* (2013.01)
(58) Field of Classification Search
   CPC ......... B60K 2350/1028; G06F 3/04817; G06F
              3/0485; G06F 3/0488; G06F 2203/04104
   See application file for complete search history.

(56) References Cited

U.S. PATENT DOCUMENTS

| | | | | |
|---|---|---|---|---|
| 2010/0295789 A1* | 11/2010 | Shin | ...................... | G06F 1/1626 345/168 |
| 2011/0107272 A1* | 5/2011 | Aguilar | ............... | G06F 3/04815 715/853 |
| 2011/0227845 A1* | 9/2011 | Lin | ....................... | G06F 3/0485 345/173 |
| 2012/0007854 A1* | 1/2012 | Cho | .................... | G06F 3/04883 345/419 |
| 2012/0176382 A1* | 7/2012 | Noh | ....................... | G06F 3/0488 345/428 |
| 2012/0299845 A1* | 11/2012 | Seo | ....................... | G06F 1/1641 345/173 |
| 2012/0306778 A1* | 12/2012 | Weeldreyer | ........... | G06F 3/0488 345/173 |
| 2013/0174039 A1* | 7/2013 | Lee | ................... | G06F 17/30852 715/723 |
| 2013/0249837 A1* | 9/2013 | Liu | .................... | G06F 3/04883 345/173 |

OTHER PUBLICATIONS

Search Report for International Patent Application No. PCT/EP2013/072176; dated Apr. 25, 2014.

* cited by examiner

METHOD FOR DISPLAYING INFORMATION IN A VEHICLE, AND A DEVICE FOR CONTROLLING THE DISPLAY

PRIORITY CLAIM

This patent application is a U.S. National Phase of International Patent Application No. PCT/EP2013/072176, filed 23 Oct. 2013, which claims priority to German Patent Application No. 10 2012 021 627.0, filed 6 Nov. 2012, the disclosures of which are incorporated herein by reference in their entirety.

SUMMARY

Illustrative embodiments relate to a method for controlling information in a vehicle. In the method, list entries in a list are assigned to graphical objects. In a main view, a subset of the graphical objects is displayed by a display device arranged in the vehicle. As a result of an input using an input device, a control device changes the graphics data in such a manner that the graphical objects in the displayed subset are changed. The illustrative embodiments also relate to a device for controlling the display of information in a vehicle. The device comprises a display device which is fastened in the vehicle. It is integrated in the vehicle, in particular. The device also comprises a control device which can be used to generate graphics data for graphical objects which can be displayed on the display device. In this case, list entries in a list are assigned to graphical objects. Furthermore, a subset of the graphical objects is displayed by the display device in a main view. The device finally comprises an input device which is coupled to the control device, in which case, in response to an input using the input device, the control device changes the graphics data in such a manner that the graphical objects in the displayed subset are changed.

BRIEF DESCRIPTION OF THE DRAWINGS

The invention is now explained using an exemplary embodiment with reference to the drawings.

DETAILED DESCRIPTION OF THE DISCLOSED EMBODIMENTS

Figure 1:
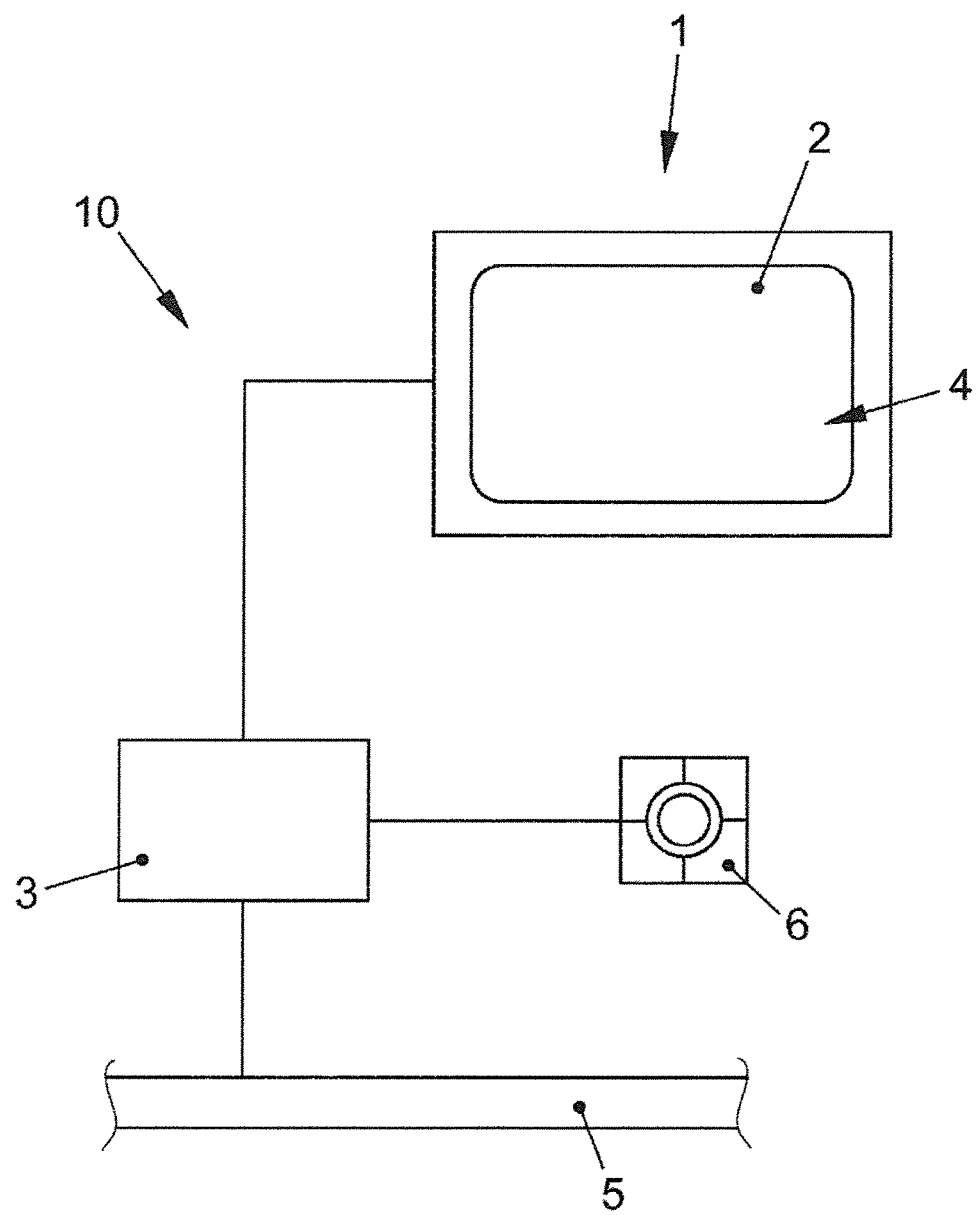
FIG. 1 schematically shows an exemplary embodiment of the device and the coupling of this device to the electronics of the vehicle.

According to at least one disclosed embodiment of the method, as a result of an input using the input device, the control device changes to a configuration mode which stipulates which graphical objects are assigned to the subset whose graphical objects are displayed in the main view.

The method is designed for the display of information on a display area in a vehicle. This is because the display areas in vehicles are often relatively small, with the result that the available display area must be used particularly well. However, it should be taken into account in this case that the driver of the vehicle, in particular, is also intended to perceive the displayed information when he only briefly directs his gaze to the display area. Furthermore, an operating process which is supported by the information display is intended to be optimized for the conditions in a vehicle.

In the method, the main view can be individually adapted for the vehicle user. Every user regularly accesses different list entries in the list. Furthermore, every user can quickly and intuitively grasp a different number of graphical objects displayed on a display area at the same time. The configuration mode of the method makes it possible for the user to individualize the main view of the information display in the vehicle.

The graphical objects which do not belong to the displayed subset can be displayed by means of an operating process. For example, scrolling can be produced using the input device or other subsets of the list can be sequentially displayed.

The main view in the method is displayed, in particular, when the display device is switched on. The display device can be switched on, for example, when the user switches on the vehicle by pressing a start button, for example, or changing the ignition key to a particular position. The list entries belonging to the graphical objects displayed in the main view are usually permanently predefined and cannot be changed. However, in the method, it is also possible to individualize this main view in the configuration mode.

According to another disclosed embodiment of the method, the list entries in the list are changed in the configuration mode. In this case, it is possible to change not only the list entries belonging to the graphical objects included in the displayed subset but rather the list entries in the entire list. For example, list entries can be removed from the list and added to this list. Furthermore, positions in a row or on an area can be assigned to the graphical objects of the list entries in the list. In this case, these positions can also be stipulated in the configuration mode. The respectively displayed graphical objects are then displayed by the display device in accordance with these positions. This also makes it possible to individualize the main view containing the graphical objects in the subset and also further views containing graphical objects for list entries in the list.

According to another disclosed embodiment of the method, a folder is defined as a new list entry in the configuration mode, to which folder list entries in the list are assigned. The graphical objects of the list entries assigned to the folder are then not displayed in the main view. They are displayed only after the list entry for the folder has been selected. This advantageously makes it possible to group different list entries in the list to reduce the total number of graphical objects displayed in a hierarchical level.

According to another disclosed embodiment of the method, the display device comprises a display area having a touch-sensitive surface. The input for changing to the configuration mode can then be carried out by means of different operating processes:

According to one disclosed embodiment, the input for changing to the configuration mode comprises touching the touch-sensitive surface at a graphical object for a list entry for at least a defined interval of time. For example, it is possible to select a list entry by briefly tapping the associated graphical object, whereupon a function associated with this list entry is performed. If the graphical object is touched for a longer time in this case, the control device changes to the configuration mode.

Furthermore, the input for changing to the configuration mode may comprise a so-called double-click on a graphical object. In this case, the user uses his fingertip, for example, to touch the touch-sensitive surface at the graphical object twice in quick succession.

Furthermore, it is possible for the input for changing to the configuration mode to comprise a so-called multitouch gesture. In this case, the touch-sensitive surface is touched at the same time in two regions which can be delimited. In this case, the touch-sensitive surface is touched, in particular, both at a graphical object for a list entry and outside such a graphical object. The user can quickly and intuitively call up the configuration mode using these inputs.

According to at least one disclosed embodiment of the method, the graphical objects are displayed differently in the configuration mode than in the main view. For example, it is possible to reproduce an animation in which the graphical objects appear to be shaking, are rotating and/or appear to be pulsating. Furthermore, the size and/or color of the graphical object can be changed in the configuration mode. This makes it possible for the user to quickly and intuitively grasp that the control device is in the configuration mode in which the user can change, in particular, the graphical objects in the displayed subset in the main view. Alternatively, a separate set-up menu can also be displayed in the configuration mode.

According to at least one disclosed embodiment of the device, as a result of an input using the input device, the control device can be changed to a configuration mode which can stipulate which graphical objects are assigned to the subset whose graphical objects are displayed in the main view.

The device is designed to carry out the method as described above. It has the same advantages as the method. The device is, in particular, integrated in the vehicle, that is to say permanently installed in the vehicle.

An exemplary embodiment of the device 10 and its arrangement in a vehicle are explained with reference to FIG. 1:

The device 10 comprises a display device 1 having a display area 2 which is arranged in the interior of the vehicle in such a manner that it is highly visible to at least one vehicle occupant, in particular the driver. The display area 2 may be provided by a display, in particular a liquid crystal display, of any design.

The device 10 also comprises a control device 3 which is connected to the display device 1. Graphics data for displaying information on the display area 2 can be generated using the control device 3.

The device 10 also comprises an input device. This input device may comprise, for example, a touch-sensitive surface 4 which is formed on the display area 2. A so-called touchscreen is therefore provided in this case. The input device may also comprise a remote mechanical operating element 6, for example a rotary/push switch.

The control device 3 is also coupled to a data bus 5 of the vehicle, via which data can be interchanged with other functional devices of the vehicle. For example, the control device 3 may be coupled, via the data bus 5, to a multimedia device, an air-conditioning system and a navigation system of the vehicle, for which information is displayed on the display area 2 and the operation of which is supported by displays on the display area 2.

An exemplary embodiment of the method which can be carried out using the display device 10 described above is explained below with reference to FIGS. 2 to 4:

The control device 3 stores a list which stores a multiplicity of list entries for a main view. A graphical object 7 is assigned to each list entry. This graphical object 7 is also stored in the control device 3. The individual graphical objects 7 are also denoted using 7-1, 7-2, . . . .

Figure 2:
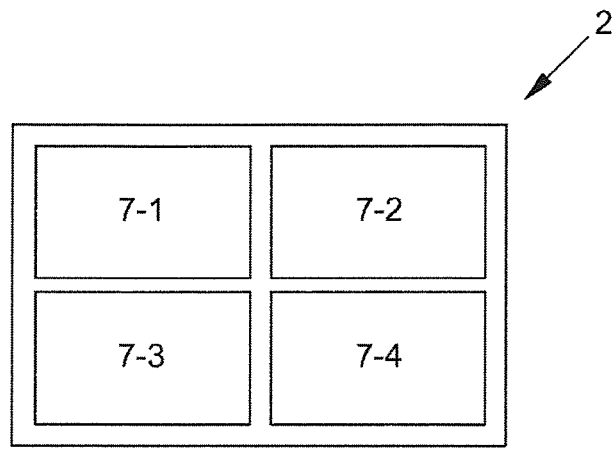
FIG. 2 shows an information display generated by the method in a vehicle in which a plurality of objects are displayed.

If the vehicle comprising the device 10 is switched on by changing the ignition key to a particular position, for example, the display device 1 is also switched on and the main view illustrated in FIG. 2 immediately appears on the display area 2. This main view displays a subset of the graphical objects 7 on the display area 2. The graphical objects 7-1 to 7-4 are displayed in the present exemplary embodiment. In contrast, the further graphical objects 7-5 to 7-12 are not immediately displayed in the main view.

By means of an input on the touch-sensitive surface 4 or using the operating element 6, the user can change the display on the display area 2 in such a manner that other graphical objects 7 are displayed on the display area 2. For example, the graphical objects 7 can be divided into groups through which it is possible to scroll by means of an operating process. It would also be possible for the user to produce scrolling by means of a swiping gesture on the touch-sensitive surface 4, for example, during which scrolling new graphical objects 7 appear on the display area 2 and other graphical objects 7 disappear. However, the subset containing the graphical objects 7-1 to 7-4 remains even after changing the display on the display area 2 in this manner, which subset is displayed in the main view which is reproduced when the display device 1 is switched on. However, the subset from the highest hierarchical level of a display and operating structure may also be involved here.

However, it is possible to change this main view in the method. The user can change the control device 3 to a configuration mode by means of a particular operating process. If, for example, the user touches the touch-sensitive surface 4 at one of the displayed graphical objects 7-1 to 7-4 for a longer interval of time, the control device 3 changes to the configuration mode. Alternatively, the change to the configuration mode can also be carried out by means of a so-called double-click on one of the displayed graphical objects 7 or by means of a multitouch gesture in which one fingertip of the user, for example, touches the touch-sensitive surface 4 at the position of a displayed graphical object 7 and another fingertip simultaneously touches a position on the touch-sensitive surface 4 at which no graphical object 7 is displayed.

Figure 3:
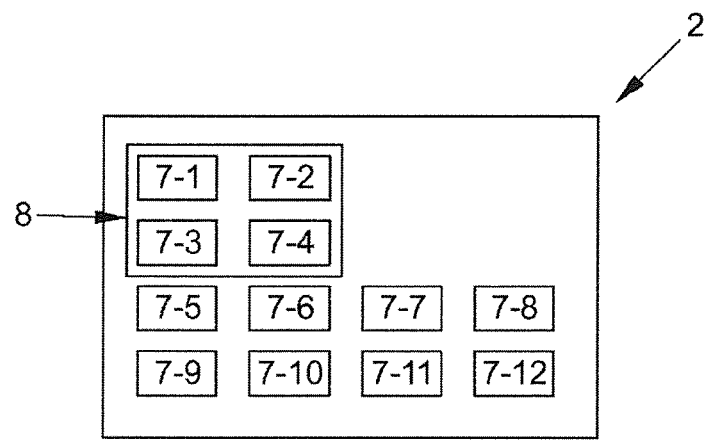
FIG. 3 shows an information display generated by the method in the configuration mode.

The change to the configuration mode is visualized by displaying the displayed graphical objects 7 such that they are shaking, are rotating or are pulsating, or a set-up menu is displayed, as shown in FIG. 3. In the display for such a set-up menu, the main view set is visualized by means of a frame 8. The graphical objects 7-1 to 7-4 in the subset which is displayed in the main view are displayed inside this frame 8.

The user can now remove graphical objects 7 from the frame 8 and can shift other graphical objects 7 into the frame 8 in a manner known per se using the touch-sensitive surface 4. The user can also remove particular graphical objects 7 from the overall list and may possibly add other graphical objects to the list. It is also possible to form new list entries which are used as folders in which a plurality of list entries can be combined. The graphical objects 7 belonging to these list entries are then no longer displayed. The list entry for the folder is displayed instead. If this folder is selected, the graphical objects 7 which have been shifted into this folder appear.

In at least one exemplary embodiment, the user removes the graphical object 7-2 from the frame 8 for the main view and instead shifts the graphical object 7-8 into the frame 8.

Furthermore, the user can also stipulate the positions of the graphical objects 7 in the frame 8 for the main view.

In an alternative embodiment, only the subset containing the graphical objects 7 for the main view is displayed in the configuration mode and the user can then remove the graphical objects 7 from the subset for the main view by means of a sliding gesture on the touch-sensitive surface 4.

The user can end the configuration mode again by means of a further input. The new main view is then displayed on the display area 2, as shown in FIG. 4.

Figure 4:
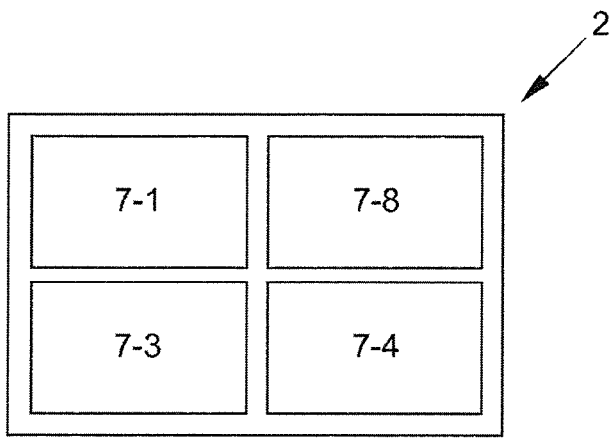
FIG. 4 shows an information display generated by the method after the configuration has been changed.

Instead of being displayed in the grid illustrated in FIGS. 2 and 4, the graphical objects 7 can alternatively also be displayed on a carousel, a line or in any other desired manner in the main view.

A vehicle, in particular a motor vehicle, contains a multiplicity of functional devices which are needed to guide the vehicle, are used for the safety and comfort of the vehicle occupants and finally display information and warnings for the vehicle occupants. In addition, the functional devices are used for communication between the vehicle occupants and devices arranged outside the vehicle. These functional devices include, for example, devices for controlling the lighting devices of the vehicle, an air-conditioning device, driver assistance systems, a navigation system, a telecommunications system and a multimedia system. The operation of these functional devices requires at least one device for user inputs and a display device for displaying information displays of the functional devices. Furthermore, the operation of the functional devices is often supported by displays on a display which is arranged in the center console of the vehicle, for example.

Hierarchical menu structures are often used to clearly display the various operating and display possibilities. A menu displays various menu items and possibly graphics or icons associated with the menu items. When a menu item is selected, a submenu containing further submenu items opens. This structure may be continued over a plurality of hierarchical levels. In addition, a particular display image can be assigned to a menu item instead of a submenu, which display image displays the information associated with the menu item.

If such menu structures are used in a motor vehicle, the problem arises whereby the navigation inside these menu structures and the acceptance of the information displayed by the display device can adversely affect the driver's attention. It is therefore desirable to display the information in the motor vehicle in such a manner that it can be quickly and intuitively absorbed by the driver, with the result that the grasping of the displayed information does not result in the driver being distracted during the journey. Furthermore, operation is intended to be able to be carried out in such an intuitive, simple and fast manner that the driver can also operate the devices in the vehicle, the information from which is displayed by the display device, during the journey even if possibly complex hierarchical structures can be displayed by the display device. The information display and the operation associated with information display in the motor vehicle therefore contribute to safety when driving the motor vehicle.

DE 10 2007 039 442 A1 discloses a method and a display device in which the graphical objects are displayed in a manner arranged on a virtual, perspectively displayed ring. In response to an input using the input device, a computing unit of a user interface device changes the graphics data in such a manner that the graphical objects rotate in a carousel-like manner on the virtual ring.

The present invention is based on the technical problem of providing a method and a device of the type mentioned at the outset in which the graphical objects in the list can be displayed for the user in such a manner that the latter can quickly and intuitively grasp them.

LIST OF REFERENCE SYMBOLS

1 Display device
2 Display area
3 Control device
4 Touch-sensitive surface
5 Data bus
6 Remote operating element
7, 7-1 to 7-12 Graphical objects
10 Device

The invention claimed is:

1. A method for displaying information in a transportation vehicle, the method comprising:
   assigning graphical objects to list entries in a list and, in a main view, displaying a subset of the graphical objects by a display device arranged in the transportation vehicle; and
   changing the graphics data as a result of an input using an input device, wherein the graphics data is changed by a control device such that the graphical objects in the displayed subset are changed,
   wherein, as a result of an input using the input device, the control device changes to a configuration mode to assign graphical objects to the subset for display in the main view, wherein at least one graphical object of the graphical objects not currently assigned to the subset is displayed in the configuration mode, and
   wherein the display device comprises a display area having a touch-sensitive surface, and the input for changing to the configuration mode comprises simultaneously touching the touch-sensitive surface both at a selected one of the graphical objects for a list entry and a location at which no other graphical objects are displayed, and a separate set-up menu is displayed in the configuration mode, wherein simultaneously touching excludes swiping.

2. The method of claim 1, wherein the main view is displayed when the display device is initially switched on.

3. The method of claim 1, wherein the list entries in the list are changed in the configuration mode.

4. The method of claim 1, wherein a folder is defined as a new list entry in the configuration mode, to which folder list entries in the list are assigned, and the graphical objects of the list entries assigned to the folder are not displayed in the main view.

5. The method of claim 1, wherein the graphical objects are displayed differently in the configuration mode than in the main view.

6. The method of claim 1, wherein the separate set-up menu includes display of the graphical objects within a frame.

7. A device for controlling the display of information in a transportation vehicle, the device comprising:
   a display device fastened in the transportation vehicle;
   a control device which can be used to generate graphics data for graphical objects which can be displayed on the display device, list entries in a list being assigned to graphical objects and a subset of the graphical objects being displayed by the display device in a main view; and an input device coupled to the control device, in which case, in response to an input using the input device, the control device changes the graphics data in such a manner that the graphical objects in the displayed subset are changed, wherein, as a result of an input using the input device, the control device can be changed to a configuration mode which can stipulate which graphical objects are assigned to the subset whose graphical objects are displayed in the main view, wherein the input device comprises a touch-sensitive surface of the display device, and the input for changing to the configuration mode comprises a multi-touch gesture of simultaneously touching the touch-sensitive surface both at a selected one of the graphical objects for a list entry and a location at which no other graphical objects are displayed to display a separate set-up menu in the configuration mode, wherein simultaneously touching excludes swiping.

8. The method of claim 7, wherein the main view is displayed when the display device is initially switched on.

9. The method of claim 7, wherein the graphical objects are displayed differently in the configuration mode than in the main view.

10. The method of claim 7, wherein the list entries in the list are changed in the configuration mode.

11. The method of claim 7, wherein a folder is defined as a new list entry in the configuration mode, to which folder list entries in the list are assigned, and the graphical objects of the list entries assigned to the folder are not displayed in the main view.

12. The method of claim 7, wherein the separate set-up menu includes display of the graphical objects within a frame.

13. A method for displaying information in a transportation vehicle, the method comprising:

assigning graphical objects to list entries in a list and, in a main view, displaying a subset of the graphical objects by a display device arranged in the transportation vehicle; and changing the graphics data as a result of an input using an input device, wherein the graphics data is changed by a control device such that the graphical objects in the displayed subset are changed, wherein, as a result of an input using the input device, the control device changes to a configuration mode which stipulates which graphical objects are assigned to the subset whose graphical objects are displayed in the main view, and wherein the display device comprises a display area having a touch-sensitive surface, and the input for changing to the configuration mode comprising simultaneously touching fixed locations of the touch-sensitive surface including touching a fixed location of a selected one of the graphical objects and touching a fixed location outside of the selected one of the graphical objects at which no other graphical objects are displayed, wherein simultaneously touching excludes swiping.

14. The method of claim 13, wherein the main view is displayed when the display device is initially switched on.

15. The method of claim 13, wherein the list entries in the list are changed in the configuration mode.

16. The method of claim 13, wherein a folder is defined as a new list entry in the configuration mode, to which folder list entries in the list are assigned, and the graphical objects of the list entries assigned to the folder are not displayed in the main view.

\* \* \* \* \*